(12) United States Patent
Kim

(10) Patent No.: US 9,408,152 B2
(45) Date of Patent: Aug. 2, 2016

(54) METHOD AND APPARATUS FOR SETTING AND EXECUTING FUNCTION PROFILES IN MOBILE COMMUNICATION TERMINAL

(71) Applicant: Samsung Electronics Co., Ltd., Gyeonggi-do (KR)

(72) Inventor: Kyu Hyun Kim, Daegu Metropolitan (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 0 days.

(21) Appl. No.: 14/490,751

(22) Filed: Sep. 19, 2014

(65) Prior Publication Data

US 2015/0005044 A1    Jan. 1, 2015

Related U.S. Application Data

(63) Continuation of application No. 11/799,784, filed on May 3, 2007, now Pat. No. 8,862,187.

(30) Foreign Application Priority Data

Nov. 9, 2006  (KR) .................. 10-2006-0110440

(51) Int. Cl.
*H04W 52/02*  (2009.01)
*H04M 1/73*  (2006.01)
(Continued)

(52) U.S. Cl.
CPC ............ *H04W 52/0251* (2013.01); *H04M 1/73* (2013.01); *H04W 8/183* (2013.01); *H04W 52/0261* (2013.01); *H04M 1/72563* (2013.01); *H04W 52/027* (2013.01);
(Continued)

(58) Field of Classification Search
CPC ............ H04W 52/00; H04W 52/0264; H04W 52/02109; H04W 52/0287; H04W 52/027
USPC .................... 455/574, 343.1, 343.2
See application file for complete search history.

(56) References Cited

U.S. PATENT DOCUMENTS 5,974,333 A  * 10/1999  Chen .................. B60R 11/0241
                                                                    455/346
7,231,198 B2      6/2007  Loughran
(Continued)

FOREIGN PATENT DOCUMENTS

JP          2005130111 A  *  5/2005
KR   10-2003-0093878 A      12/2003
(Continued)

OTHER PUBLICATIONS

Electronic Translation JP2005-130111, Fujii, May 2005.*
(Continued)

*Primary Examiner* — Marisol Figueroa
(74) *Attorney, Agent, or Firm* — Cha & Reiter, LLC.

(57) ABSTRACT

A method and apparatus for setting and executing a function profile in a mobile communication terminal to manage its battery usage. The method includes determining whether a function profile setting function is set; selecting, if a function profile setting function is set, a specific function and executing the function according to a set function profile. Therefore, each function of the mobile communication terminal can be executed in an optimal function profile which in turn reduces unnecessary power consumption of the mobile communication terminal.

21 Claims, 6 Drawing Sheets

(51) Int. Cl.
  *H04W 8/18* (2009.01)
  *H04M 1/725* (2006.01)
(52) U.S. Cl.
  CPC ...... *H04W 52/0264* (2013.01); *H04W 52/0274* (2013.01); *Y02B 60/50* (2013.01)

(56) References Cited

U.S. PATENT DOCUMENTS

| | | |
|---|---|---|
| 7,242,971 B2 | 7/2007 | Park |
| 8,862,187 B2* | 10/2014 | Kim ............................ 455/574 |
| 2002/0065618 A1* | 5/2002 | Oh ........................ G06F 1/3203 702/57 |
| 2002/0132653 A1 | 9/2002 | Okamoto et al. |
| 2003/0008686 A1 | 1/2003 | Park et al. |
| 2004/0029621 A1* | 2/2004 | Karaoguz et al. ............ 455/574 |
| 2005/0070339 A1 | 3/2005 | Kim |
| 2005/0204125 A1* | 9/2005 | Chin ............................. 713/100 |
| 2005/0268240 A1 | 12/2005 | Kankaanpaa |
| 2006/0017833 A1* | 1/2006 | Gong et al. .................. 348/335 |
| 2006/0046694 A1 | 3/2006 | Yu |
| 2007/0213090 A1* | 9/2007 | Holmberg ................. 455/550.1 |
| 2007/0218886 A1 | 9/2007 | Fujimoto et al. |
| 2008/0102899 A1 | 5/2008 | Zhang et al. |
| 2014/0221046 A1* | 8/2014 | Uusitalo ...................... 455/563 |

FOREIGN PATENT DOCUMENTS

| | | |
|---|---|---|
| KR | 10-2004-0069512 A | 8/2004 |
| KR | 10-2005-0070542 A | 7/2005 |
| KR | 10-2006-0057465 A | 5/2006 |

OTHER PUBLICATIONS

TransTalk 9000—MMDW 9040 Wireless Pocket Phone Installation and Use. AVAYA Communication, Feb. 2001.

* cited by examiner

METHOD AND APPARATUS FOR SETTING AND EXECUTING FUNCTION PROFILES IN MOBILE COMMUNICATION TERMINAL

CROSS REFERENCE TO RELATED APPLICATIONS

This application is a Continuation of U.S. patent application Ser. No. 11/799,784, filed on May 3, 2007 which claims priority to an application entitled "METHOD AND APPARATUS FOR SETTING AND EXECUTING FUNCTION PROFILES IN MOBILE COMMUNICATION TERMINAL," filed in the Korean Intellectual Property Office on Nov. 9, 2006 and assigned Serial No. 2006-0110440, the contents of which are incorporated herein by reference.

BACKGROUND

1. Field

The present invention relates to a method and apparatus for extending the battery life of a mobile communication terminal.

2. Description of the Related Art

In a mobile communication terminal, it is desirable to extend the battery life. The mobile communication terminal typically uses a pre-charged battery as a power source, and according to the charge capacity of a battery, a maximum usage time thereof is determined.

Nowadays, the mobile communication terminal has various functions in addition to the conventional communication function. For example, the mobile communication terminal is now equipped for providing time information such as a time or date, electronic scheduler function, alarm function, game function, photographing function, or music file playing function. The additional functions are sometimes used as frequently as the conventional communication function.

In general, the mobile communication terminal operates the communication function and other additional functions in a power-up state, i.e. a state in which power is supplied to the entire device of the mobile communication terminal.

Accordingly, even when only a specific function of a mobile communication terminal is desired, the power is supplied to the entire device, thus unnecessarily shortening the battery life.

SUMMARY

The present invention has been made in an effort to solve the above problems and provides additional advantages, by providing a method and apparatus for setting and executing a function profile in a mobile communication terminal that can reduce the power consumption via selectively blocking power supply to unused or unnecessary components of the mobile communication terminal.

Another aspect of the present invention is to provide a method and apparatus for setting and executing a function profile in a mobile communication terminal that can execute a specific function in an optimal function profile.

In accordance with an aspect of the present invention, a method of setting and executing a function profile in a mobile communication terminal includes: determining whether a function profile setting function is set; selecting, if a function profile setting function is set, a specific function and executing the function according to a set function profile.

In accordance with another aspect of the present invention, a method of setting and executing a function profile in a mobile communication terminal includes: determining whether a function profile setting function exists; executing, if a function profile setting function exists, a function according to the function profile setting function; and executing, if another function is selected while executing the function according to the set function profile, the newly selected function according to the set function profile.

In accordance with another aspect of the present invention, a method of setting and executing a function profile in a mobile communication terminal includes: determining whether a function profile setting function exists; selecting, if a function profile setting function exists, a specific function; setting a function profile of the selected function; and selecting, if a function profile setting function is set, a specific function and executing the function according to a set function profile.

In accordance with another aspect of the present invention, a mobile communication terminal having a function profile setting function includes: a function profile setting unit for setting a function profile; and a controller for controlling to set the function profile necessary for driving each unit of the mobile communication terminal by the function profile setting unit.

BRIEF DESCRIPTION OF THE DRAWINGS

The above features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

In exemplary embodiments of the present invention, a "backlight" represents a background light of a display unit or key pad of a mobile communication terminal and is configured to assist a user to see the displayed content or the key pad in a dark place. A "Hard Disk Drive (HDD)" is an auxiliary memory device for storing data and provided within the mobile communication terminal.

Figure 1:
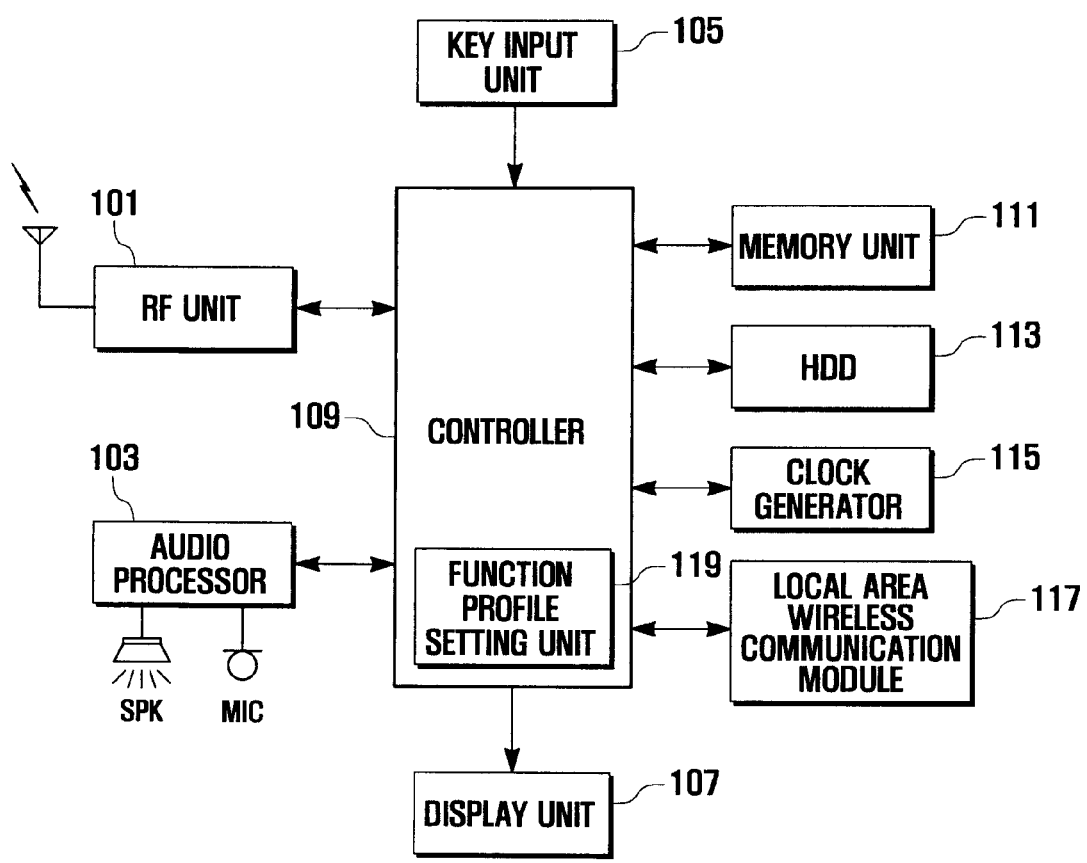
FIG. 1 is a block diagram illustrating a configuration of a mobile communication terminal for setting and executing a function profile according to an exemplary embodiment of the present invention.

FIG. 1 is a block diagram illustrating a configuration of a mobile communication terminal for setting and executing a function profile according to an exemplary embodiment of the present invention.

Referring to FIG. 1, the mobile communication terminal includes a radio frequency (RF) unit 101, audio processor 103, key input unit 105, display unit 107, controller 109, memory unit 111, HDD 113, clock generator 115, local area wireless communication module 117, and function profile setting unit 119.

The RF unit 101 performs a wireless communication function of the mobile communication terminal and includes an RF transmitter for up-converting a frequency of a signal to be transmitted and amplifying the signal, and an RF receiver for low-noise amplifying a received signal and down-converting a frequency thereof.

The audio processor 103 reproduces an audio signal output from an audio codec of the controller 109 through a speaker SPK and transmits an audio signal generated from a microphone MIC to the audio codec of the controller 109.

The key input unit 105 receives a user's manipulation signal for controlling the operation of the mobile communication terminal. Further, the key input unit 105 receives a user's manipulation signal for setting a function profile and for performing communication and additional functions. Under the key pad of the key input unit 105, a backlight including a plurality of Light Emitting Diodes (LED) is provided.

The display unit 107 displays output data under the control of the controller 109. The display unit 107 may use an LCD, and in this case, the display unit 107 includes an LCD controller, memory for storing image data, and LCD display element. When the display unit 107 is a touch screen, the display unit 107 is used as an input unit. Under the liquid crystal screen of the display unit 107, a backlight including a plurality of LEDs is provided.

The controller 109 controls the entire operation of the mobile communication terminal. The controller 109 also controls the profile setting function according to the teachings of the present invention. The controller 109 adjusts the backlights of the key input unit 105 and the display unit 107 by detecting an adjusted brightness value of the backlight stored in the memory unit 111. Further, the controller 109 controls the operation of the HDD 113 and the local area wireless communication module 117 and controls a clock frequency of the clock generator 115.

The function profile setting unit 119 stores function profiles optimally set for each function and enables, if a function profile function is set through the manipulation of the key input unit 105, each function to be automatically executed in the set function profile.

The memory unit 111 includes a program memory and a data memory. The program memory stores programs for controlling the general operation of the mobile communication terminal and programs for performing a function profile setting function according to the present exemplary embodiment. The data memory temporarily stores data generated while performing the programs. Further, the memory unit 111 stores a backlight brightness value corresponding to each graduation of the backlight.

The HDD 113 is an auxiliary memory device for storing and reading data while rotating a circular aluminum substrate covered with a magnetic material. The HDD 113 has a form in which disks are stacked, and concentric circles called tracks are formed on the disk. Data are electromagnetically recorded within each disk. A head records data on, and reads data from, the tracks.

The clock generator 115 provides a clock necessary for driving the controller 109 that stably provides a high speed of clock signal and receives a control signal for determining the driving from the controller 109. The clock generator 15 generally uses an oscillator, not the crystal or resonator frequently found in mobile communication terminals. The clock generator 115 can vary a clock frequency for each function by the setting of the function profile setting unit 119 according to the present exemplary embodiment.

The local area wireless communication module 117 performs a series of operations for transmitting and receiving a control signal and an audio signal through a wireless interface. The local area wireless communication module 117 can use a communication type such as Bluetooth, Infrared, or Zigbee and can use various wireless communication modules for transmitting and receiving a signal by forming a communication channel in a local area.

Figure 2:
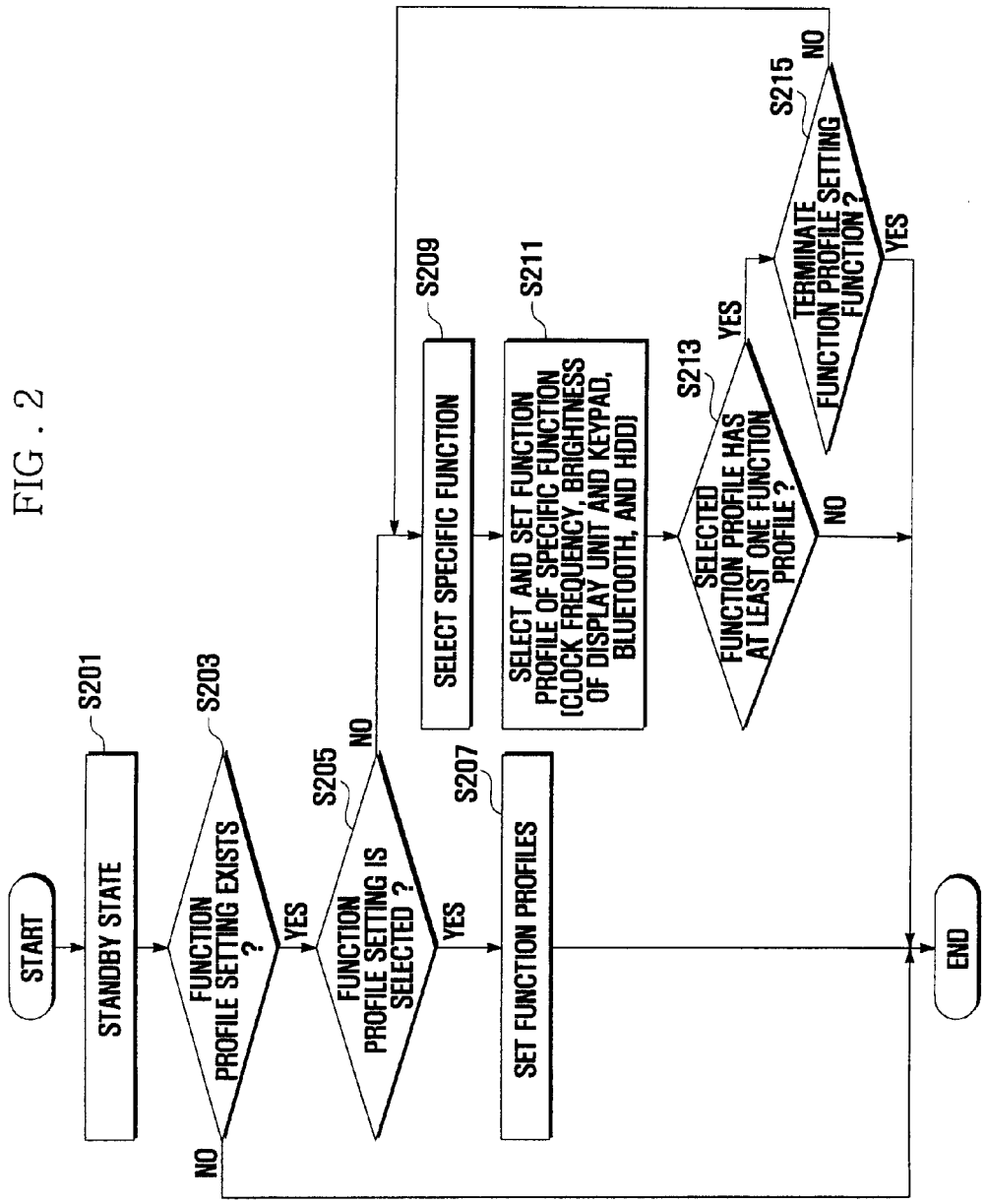
FIG. 2 is a flowchart illustrating a setting operation of a function profile in a mobile communication terminal according to an exemplary embodiment of the present invention.
Figure 3:
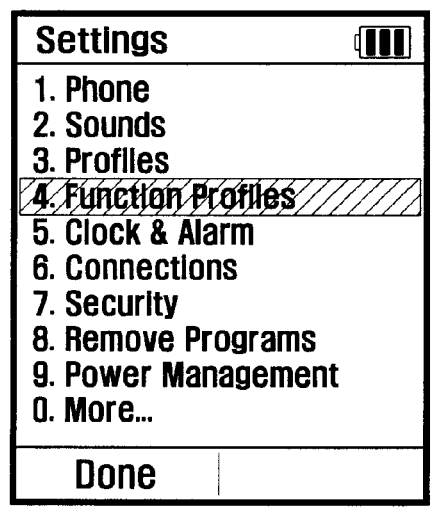
FIG. 3 is a diagram illustrating an example of a screen showing the selection of a function profile in a mobile communication terminal in the setting operation of FIG. 2.
Figure 4:
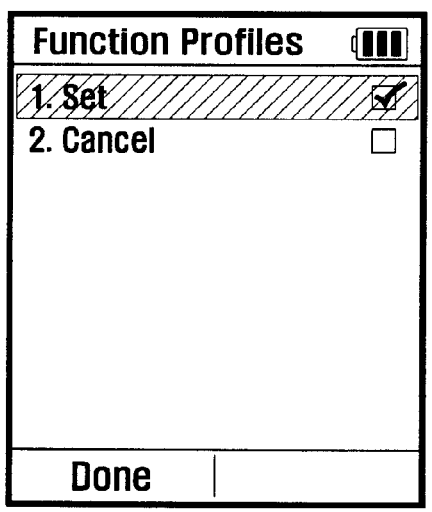
FIG. 4 is a diagram illustrating an example of a screen showing the setting of a function profile in a mobile communication terminal in the setting operation of FIG. 2.
Figure 5A:
FIG. 5A, FIG. 5B and FIG. 5C are diagrams illustrating examples of screens showing steps of setting a function profile in a mobile communication terminal in the setting operation of FIG. 2.
Figure 5B:
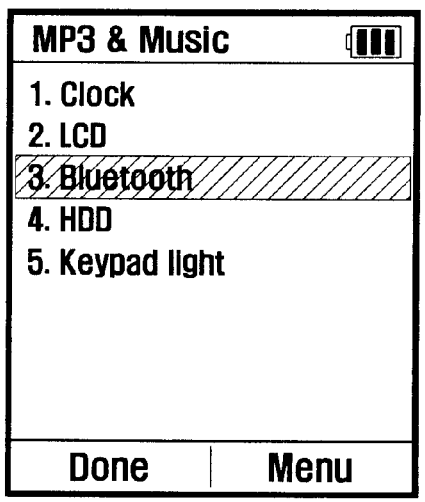
Figure 5C:
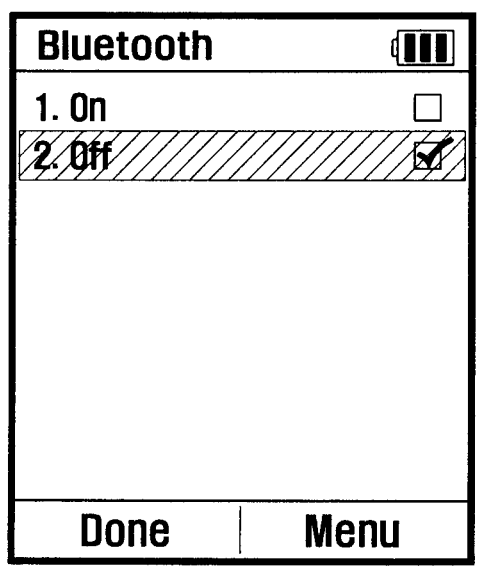

FIG. 2 is a flowchart illustrating the setting operation of a function profile in a mobile communication terminal according to an exemplary embodiment of the present invention. FIG. 3 is a diagram illustrating an example of a screen showing the selection of a function profile in a mobile communication terminal in the setting operation of FIG. 2. FIG. 4 is a diagram illustrating an example of a screen showing the setting of a function profile in a mobile communication terminal in the setting operation of FIG. 2. FIGS. 5a to 5c are diagrams illustrating examples of screens showing steps of setting a function profile in a mobile communication terminal in the setting operation of FIG. 2.

Referring to FIGS. 1 to 5c, the operation of setting a function profile in the mobile communication terminal of FIG. 1 is described hereinafter.

As shown in FIG. 2, the controller 109 recognizes a standby state of the mobile communication terminal (S201).

Next, the controller 109 determines whether a function profile setting function exists in the mobile communication terminal (S203). If the function profile setting does not exist in the mobile communication terminal, the process ends because the present exemplary embodiment cannot be executed.

If the function profile setting exists in the mobile communication terminal, the controller 109 determines whether the function profile setting is selected (S205). The function profile setting can be selected by a user through the key input unit 105, and a screen for selecting the function profile setting is shown in FIG. 3. As shown in FIG. 3, a function profile setting option is selected from a 'settings' menu on the screen of the mobile communication terminal through the key input unit 105.

If a function profile setting is selected, the controller 109 automatically sets the function profiles (S207). If the user selects the function profile setting at step S205, a screen for selecting 'set' from the function profile menu is shown in FIG. 4. The user sets the function profiles through the key input unit 105. Accordingly, optimal function profiles for each function are automatically set.

The optimal function profiles for each function are shown in Table 1. The function profiles shown in Table 1 are for illustrative purposes, thus it should be noted that function profiles are not limited thereto.

TABLE 1

| Function | Clock frequency | Brightness of display unit | Bluetooth | HDD | Brightness of key pad |
|---|---|---|---|---|---|
| Phone | 208 MHz | 1 | OFF | OFF | OFF |
| MP3 | 416/208 MHz | 2 | OFF | ON | OFF |
| Movie | 416 MHz | 5 | OFF | ON | OFF |
| Text | 208 MHz | 4 | OFF | ON | OFF |
| Game | 416 MHz | 4 | OFF | ON | ON |
| Maximum power Saving | 208 MHz | 1 | OFF | OFF | OFF |
| Custom | Random change by user | | | | |

If the function profile setting is not selected at step S205, a user inputs a specific function and the controller 109 recognizes the specific function (S209). When the user does not select the function profile setting from the screen shown in FIG. 3 through the key input unit 105, the entire functions of the mobile communication terminal are displayed in the display unit 107 as shown in FIG. 5a. The user can select a specific function, e.g. an MP3 & Music function, for setting a function profile from the several displayed functions.

After selecting a specific function, the user selects a specific function profile of the function and inputs a setting value, and the controller 109 recognizes the function profile (S211). When the user selects the specific function from the screen shown in FIG. 5a through the key input unit 105, function profiles (e.g. a clock frequency, brightness of a display unit, operation state of Bluetooth, operation state of HDD, and brightness of keypad) of hardware provided within the mobile communication terminal are displayed in the display unit 107, as shown in FIG. 5b. The user can select a specific function profile for setting, e.g. Bluetooth, from the function profiles displayed in the display unit 107.

As shown in FIG. 5c, the user inputs a setting value for the selected function profile, e.g. whether to operate Bluetooth, through the key input unit 105. As shown in FIGS. 5a to 5c, because the user selects the MP3 & Music function, it is unnecessary to operate Bluetooth and thus the user turns off the Bluetooth feature. In the present exemplary embodiment, the setting operation of the function profile is illustrated to set one function in a single function profile, however it should be noted that the setting operation according to the teachings of the present invention is not limited thereto.

Next, the controller 109 determines whether the selected function profile has at least one function profile (S213). If the selected function profile does not have at least one function file, the controller 109 terminates the process of setting a function profile.

If the selected function has at least one function profile, the controller 109 determines whether to terminate the function profile setting function (S215). Even though the selected function has at least one function profile, the user may, nevertheless, want to terminate the function profile setting function. Hence, even though function profiles are not set for each function, if a termination signal of the function profile setting function is received, the controller 109 terminates the process. If a termination signal of the function profile setting function is not received, the process returns to step S209, and the controller 109 continues to perform the process of setting the function profile.

Figure 6:
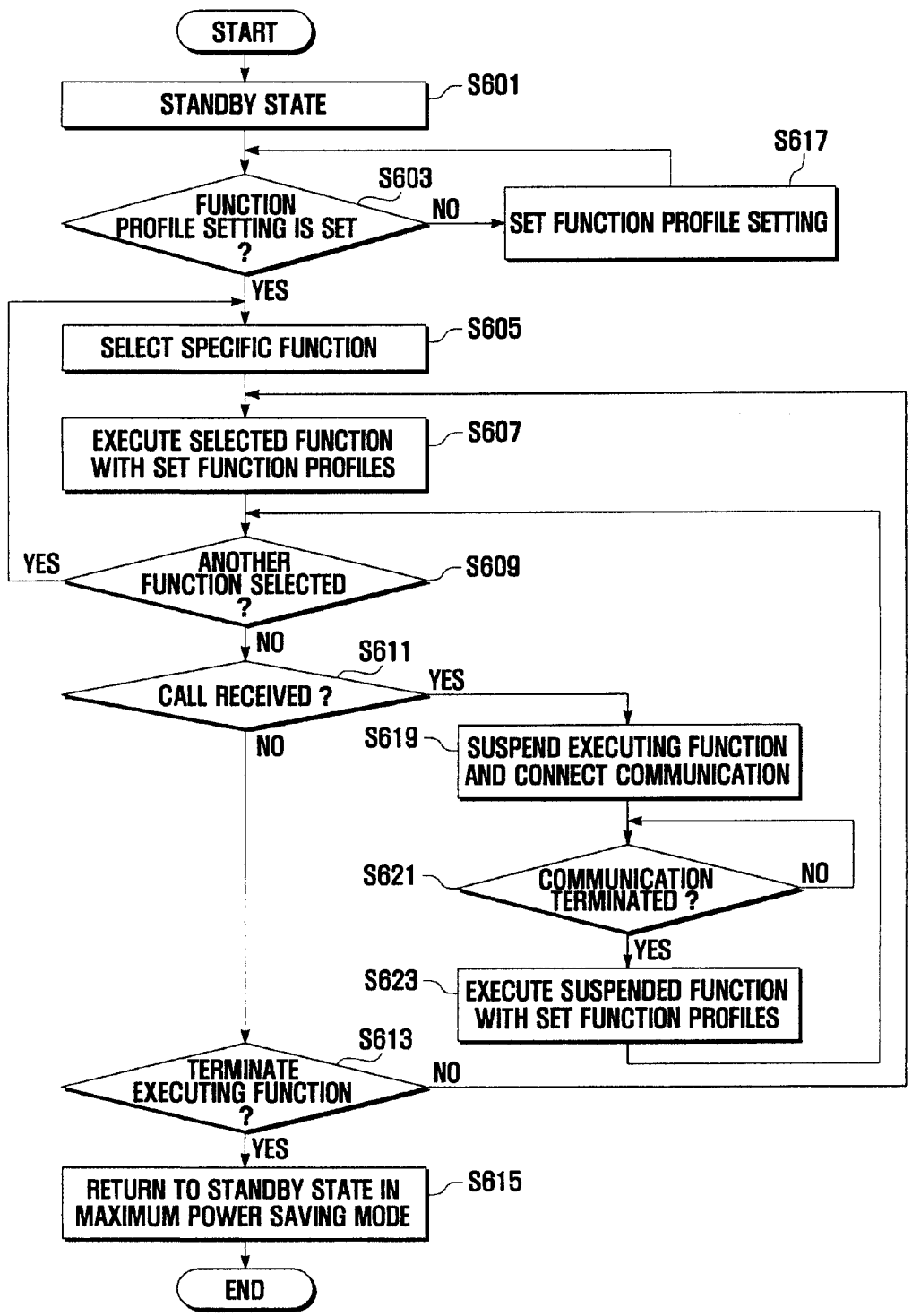
FIG. 6 is a flowchart illustrating an executing operation of a function profile in a mobile communication terminal according to an exemplary embodiment of the present invention.

FIG. 6 is a flowchart illustrating the operation steps of a function profile in the mobile communication terminal of FIG. 1 according to an exemplary embodiment of the present invention.

Referring to FIG. 6, the controller 109 recognizes a standby state of the mobile communication terminal (S601).

Next, the controller 109 determines whether a function profile setting function is set (S603).

If a function profile setting function is not set, the controller 109 sets the function profile setting (S617). The function profile setting may be set with a method described with reference to FIGS. 2 to 5c.

If the function profile setting is set, the controller 109 recognizes a user input selection of a specific function (S605). The specific function is selected through the key input unit 105.

Next, the controller 109 executes the selected function with the corresponding set function profiles (S607). As in the described method of setting a function profile, for example, an MP3 & Music function is executed with the function profiles shown in Table 1.

The controller 109 determines whether another function is selected while executing the selected function (S609). If another function is selected while executing the selected function, the process returns to step S605 and the controller 109 executes the newly selected function with the corresponding set function profiles.

If another function is not selected while executing the selected function, the controller 109 determines whether a call is received (S611). The controller 109 determines whether a call is received, for example, while listening to music executed with the MP3 & Music function.

If a call is not received, the controller 109 determines whether a termination signal of the executing function is received (S613). If a termination signal of the executing function is not received, the process returns to step S607 and the controller 109 continues to execute the selected function.

If a termination signal of the executing function is received, the mobile communication terminal returns to a standby state (S615). Here, the standby state of the mobile communication terminal is a standby state set in a function profile, e.g. a maximum power saving mode set in the described function profile setting process.

If a call is received at step S611, the controller 109 suspends the executing function and connects to establish a communication (S619). When the call is received, the controller 109 suspends an execution of the MP3 & Music function and makes a call connection.

Next, the controller 109 determines whether the communication is terminated (S621), and if the communication is terminated, continues to execute the suspended function with the set function profiles (S623). When the communication is terminated, the controller 109 executes again the MP3 & Music function.

The process then returns to step S609, and the controller 109 determines whether another function is selected.

As described above, according to the present invention, each function of the mobile communication terminal can be executed in an optimal function profile by selectively blocking power supply to unused or unnecessary components so that unnecessary power consumption of the mobile communication terminal can be reduced.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims. While the present invention may be embodied in many different forms, specific embodiments of the present invention are shown in drawings and are described herein in detail, with the understanding that the present disclosure is to be considered as an exemplification of the principles of the invention and is not intended to limit the invention to the specific embodiments illustrated.

What is claimed is:

1. A method comprising:
executing a selected application at a mobile electronic device;
operating, based on a first profile corresponding to the selected application, one or more components of the mobile electronic device in a first operation mode, the first profile including a state of a wireless signal reception function;
executing a call connection of a phone application at the mobile electronic device;
suspending at least a part of the wireless signal reception function of the selected application in response to the executing the call connection;
operating, based on a second profile corresponding to the phone application, at least one of the one or more components in a second operation mode; and
in response to a termination of the call connection, automatically resuming execution of the selected application based on the first profile;
wherein the phone application is different from the selected application.

2. The method of claim 1, wherein at least one of the first profile or the second profile comprises setting information to decide whether to utilize at least one of hardware components of the mobile electronic device.

3. The method of claim 2, wherein the operating the one or more components in the second operation mode comprises suspending the one or more components based on the setting information of the second profile.

4. The method of claim 1, wherein at least one of the first profile or the second profile comprises utilization level information to operate the one or more components in a specific operation level.

5. The method of claim 4, wherein the operating in the second operation mode comprises changing a current operation level of the one or more components based at least on the utilization level information of the second profile.

6. The method of claim 4, wherein the utilization level information comprises at least one of battery power supplement level, processor clock frequency level, brightness level, and communication condition level.

7. The method of claim 1, wherein at least the first profile comprises setting information to decide whether to utilize a module for receiving a specific type of wireless signals.

8. The method of claim 1, wherein the selected application comprises a texting application, a music application, a video application or a game application.

9. The method of claim 1, wherein the wireless signal reception function is a function for receiving a Bluetooth signal.

10. An apparatus comprising:
a memory to store a first profile corresponding to a selected application and a second profile corresponding to a phone application; and
a controller configured to:
execute the selected application,
operate, based on the first profile, one or more components of the apparatus in a first operation mode, the first profile including a state of a wireless signal reception function,
execute a call connection of a phone application,
suspend at least a part of the wireless signal reception function of the selected application in response to the executing of the call connection,
operate, based on the second profile, at least one of the one or more components in a second operation mode, and
in response to a termination of the call connection, automatically resume execution of the selected application based on the first profile;
wherein the phone application is different from the selected application.

11. The apparatus of claim 10, wherein at least one of the first profile or the second profile comprises setting information to decide whether to utilize at least one of hardware components of the apparatus.

12. The apparatus of claim 11, wherein the controller is configured to, when the controller operates the one or more components in the second operation mode, suspend the one or more components based on the setting information of the second profile.

13. The apparatus of claim 10, wherein at least one of the first profile or the second profile comprises utilization level information to operate the one or more components in a specific operation level.

14. The apparatus of claim 13, wherein the controller is configured to, when operating the one or more components in the second operation mode, change a current operation level of the one or more components based at least on the utilization level information of the second profile.

15. The apparatus of claim 13, wherein the utilization level information comprises at least one of battery power supplement level, processor clock frequency level, brightness level, communication condition level.

16. The apparatus of claim 10, wherein at least the first profile comprises setting information to decide whether to utilize a module for receiving a specific type of wireless signals.

17. The apparatus of claim 10, wherein the selected application comprises a texting application, a music application, a video application or a game application.

18. The apparatus of claim 10, wherein the controller is configured to adjust information of at least one of the first profile or the second profile based on a user input.

19. The apparatus of claim 10, wherein the wireless signal reception function is a function for receiving a Bluetooth signal.

20. A non-transitory computer-readable medium storing instructions, when executed by one or more processors, cause the one or more processors to perform operations comprising:
executing a selected application at a mobile electronic device;
operating, based on a first profile corresponding to the selected application, one or more components of the mobile electronic device in a first operation mode, the first profile including a state of a wireless signal reception function;
executing a call connection of a phone application at the mobile electronic device;
suspending at least a part of the wireless signal reception function of the selected application in response to the executing the call connection;
operating, based on a second profile corresponding to the phone application, at least one of the one or more components in a second operation mode; and
in response to a termination of the call connection, automatically resuming execution of the selected application based on the first profile;

wherein the selected application is different the phone application.

21. The non-transitory computer-readable medium of claim 20, wherein the wireless signal reception function is a function for receiving a Bluetooth signal.

\* \* \* \* \*